US012674501B2

(12) United States Patent
Keum et al.

(10) Patent No.: US 12,674,501 B2
(45) Date of Patent: Jul. 7, 2026

(54) DAMPER FOR VEHICLE SEAT

(71) Applicants: Hyundai Motor Company, Seoul (KR); Kia Corporation, Seoul (KR); Sung Rhim T&T Co., Ltd., Daegu (KR)

(72) Inventors: Dong Hoon Keum, Busan (KR); Sang Do Park, Suwon (KR); Sang-Soo Lee, Hwaseong (KR); Da Eun Lee, Hwaseong (KR); Sung Gu Kim, Ulsan (KR); Min Hyuk Kwak, Suwon (KR); Chan Ho Jung, Gunpo (KR); Hoon Bok Lee, Hwaseong (KR); Chil Seok Ju, Daegu (KR); Kwang Seok Jung, Daegu (KR)

(73) Assignees: Hyundai Motor Company, Seoul (KR); Kia Corporation, Seoul (KR); Sung Rhim T&T Co., Ltd., Daegu (KR)

( * ) Notice: Subject to any disclaimer, the term of this patent is extended or adjusted under 35 U.S.C. 154(b) by 313 days.

(21) Appl. No.: 18/530,803

(22) Filed: Dec. 6, 2023

(65) Prior Publication Data

US 2024/0288049 A1     Aug. 29, 2024

(30) Foreign Application Priority Data

Feb. 23, 2023     (KR) ........................ 10-2023-0024001

(51) Int. Cl.
*F16F 15/02* (2006.01)
*B60N 2/90* (2018.01)

(52) U.S. Cl.
CPC ................ *F16F 15/02* (2013.01); *B60N 2/90* (2018.02); *F16F 2232/00* (2013.01)

(58) Field of Classification Search
CPC .................................. B60N 2/90; F16F 15/02
See application file for complete search history.

(56) References Cited

FOREIGN PATENT DOCUMENTS

| | | | | |
|---|---|---|---|---|
| EP | 3467334 A1 * | 4/2019 | ............. | F16F 7/108 |
| KR | 10-2008-0000617 A | 1/2008 | | |
| KR | 101692153 B1 * | 1/2017 | ............... | B60N 2/68 |
| KR | 102494220 B1 * | 2/2023 | | |

* cited by examiner

*Primary Examiner* — Anthony D Barfield
(74) *Attorney, Agent, or Firm* — Fox Rothschild LLP

(57) ABSTRACT

A damper for a vehicle seat includes a vibrating mass member assembly including a vibrating mass member and a fixing member protruding from a side of the vibrating mass member, a guide bush accommodating the fixing member therein, coupled to each of the both sides of the vibrating mass member, and guiding the vibrating mass member to move in all directions, and a mounting bracket having an insertion hole into which the guide bush is inserted and fixedly formed on the vehicle seat. The damper may include an additional fixing member protruding from another side of the vibrating mass member, such that the fixing member and the additional fixing member protrude from both sides of the vibrating mass member.

18 Claims, 5 Drawing Sheets

DAMPER FOR VEHICLE SEAT

CROSS-REFERENCE TO RELATED APPLICATION

This application claims under 35 U.S.C. § 119(a) the benefit of Korean Patent Application No. 10-2023-0024001 filed on Feb. 23, 2023, the entire contents of which are incorporated herein by reference.

BACKGROUND

(a) Technical Field

The present disclosure relates to a damper for a vehicle seat, more particularly, to the damper for the vehicle seat having a guide bush for accommodating a fixing member, in order to address a vibration problem caused by low frequency resonance.

(b) Description of the Related Art

Generally, different factors may affect vibration performance of a vehicle, such as contact between an uneven road surface and tires, vibrations caused by engine behavior, etc. In addition, there may be a difference in strengths of vibrations depending on the type of vehicle. In general, poor vibration performance negatively affects the riding comfort of vehicle occupants, who may feel uncomfortable and suffer from fatigue as the result of vibration and/or noise, thereby inducing noise stress.

In order to attenuate or suppress vibrations, products may be attached to various parts of the vehicle. For example, a damper for a vehicle seat may be installed on the vehicle seat to attenuate vibrations.

However, since a conventional damper for a vehicle seat is formed by coupling a vibrating mass member and a bracket for fixing the vibrating mass member by a bush made of rubber, the overall volume of the damper may be large, and thus there is a disadvantage in that productivity is very low due to a limited quantity of material that may be accommodated in a mold for a curing operation of integrating the vibrating mass member and the bracket using the bush.

In addition, since a finishing operation (e.g., removal of rubber) typically is performed in a state in which the vibrating mass member is integrated into the bracket, the work may be inconvenient and inefficient, and in addition, since the conventional bumper needs to be subjected to a separate painting operation after finishing the curing process, the curing and painting processes are consecutively performed. Therefore, there is a problem in that it may consume a lot of manufacturing time, and result in high costs, and with low productivity.

In addition, since a natural frequency is reduced as the number of functions applied to vehicle seats increases, and as vehicle seats tend to become heavier, in installing the damper on the vehicle seat, a weight of the vibrating mass member must be increased and a thickness of the bush must be reduced to reduce vibrations in a specific frequency band having a low natural frequency.

However, when only the weight of the vibrating mass member is increased as described above, a load is inevitably concentrated on the bush for supporting the vibrating mass member, and thus damage such as breakage of the bush may occur, resulting in degradation of vibration performance of the vehicle seat.

SUMMARY

The present disclosure is directed to providing a damper for a vehicle seat, which includes a vibrating mass member constituting a fixing point in the form of a pin and a bush made of rubber to be connected to a bracket mounted on the vehicle seat, where the vibrating mass member has a mounting for fixing the bush in a width direction provided on both sides of the bracket to enable the vibrating mass member to move vertically and horizontally in a specific frequency band by elasticity of the bush, thereby reducing vibrations transmitted to the vehicle seat.

A damper for a vehicle seat according to one embodiment of the present disclosure includes a vibrating mass member assembly including a vibrating mass member and a fixing member protruding from a side of the vibrating mass member, a guide bush accommodating the fixing member therein, coupled to each of the both sides of the vibrating mass member, and guiding the vibrating mass member to move in all directions, and a mounting bracket having an insertion hole into which the guide bush is inserted and fixedly formed on the vehicle seat.

Further, an additional fixing member may protrude from another side of the vibrating mass member, such that the fixing member and the additional fixing member protrude from both sides of the vibrating mass member.

Here, the guide bush may include a coupling member formed to surround an outer circumferential surface of the fixing member, a fastening member formed to have a diameter corresponding to a diameter of the insertion hole and positioned to be caught in the insertion hole, and a connection member for connecting the coupling member and the fastening member, restricting a movement range of the fixing member inside the insertion hole, and formed to absorb an impact transmitted from the vibrating mass member.

The connection member may have an "U" shape and have one end and an opposite end connecting the coupling member and the fastening member.

Preferably, the guide bush may be made of a rubber material having elasticity.

In addition, the vibrating mass member assembly may include a plurality of vibrating mass members having different weights.

In addition, the vibrating mass member assembly may be selectively replaced and coupled to the guide bush.

In addition, a plurality of guide bushes having different thicknesses may be formed to accommodate the fixing member.

In addition, a plurality of guide bushes replaceably coupled to the vibrating mass member.

In addition, the mounting bracket may be fixedly mounted on a front surface of the vehicle seat vertically.

In addition, the mounting bracket may be fixedly mounted on a rear surface of the vehicle seat horizontally.

A vehicle seat may include a damper as described above.

A vehicle may include a damper as described above.

Meanwhile, a damper for a vehicle seat according to another embodiment of the present disclosure includes a vibrating mass member assembly including a vibrating mass member and a fixing member protruding from a side of the vibrating mass member, a guide bush accommodating the fixing member therein, coupled to each of the both sides of the vibrating mass member, made of a rubber material having elasticity, and guiding the vibrating mass member to move in all directions, and a mounting bracket having an insertion hole into which the guide bush is inserted and fixedly formed to the vehicle seat, wherein the guide bush restricts a movement range of the fixing member inside the insertion hole and absorbs an impact transmitted from the vibrating mass member.

Further, an additional fixing member protruding from another side of the vibrating mass member, such that the fixing member and the additional fixing member protrude from both sides of the vibrating mass member.

According to the present disclosure, by including the vibrating mass member constituting the fixing point in the form of the pin and the bush made of rubber to be connected to a bracket mounted on the vehicle seat and having the mounting for fixing the bush in the width direction provided on both sides of the bracket to enable the vibrating mass member to move vertically and horizontally in the specific frequency band by the elasticity of the bush, it is possible to reduce vibrations transmitted to the vehicle seat.

In addition, compared to the conventional damper structure in which one side of the bush is bonded to the vibrating mass member and an opposite side of the bush is bonded to the bracket, since the damper for the vehicle seat according to the present disclosure has the structure in which the bush is movably formed, it is possible to prevent the problem that the part to which the bush is bonded is damaged due to the input load.

The above and other features of the disclosure are discussed infra.

BRIEF DESCRIPTION OF THE DRAWINGS

The above and other features of the present disclosure will now be described in detail with reference to certain exemplary examples thereof illustrated in the accompanying drawings which are given herein below by way of illustration only, and thus are not limitative of the present disclosure, and wherein.

Figure 1:
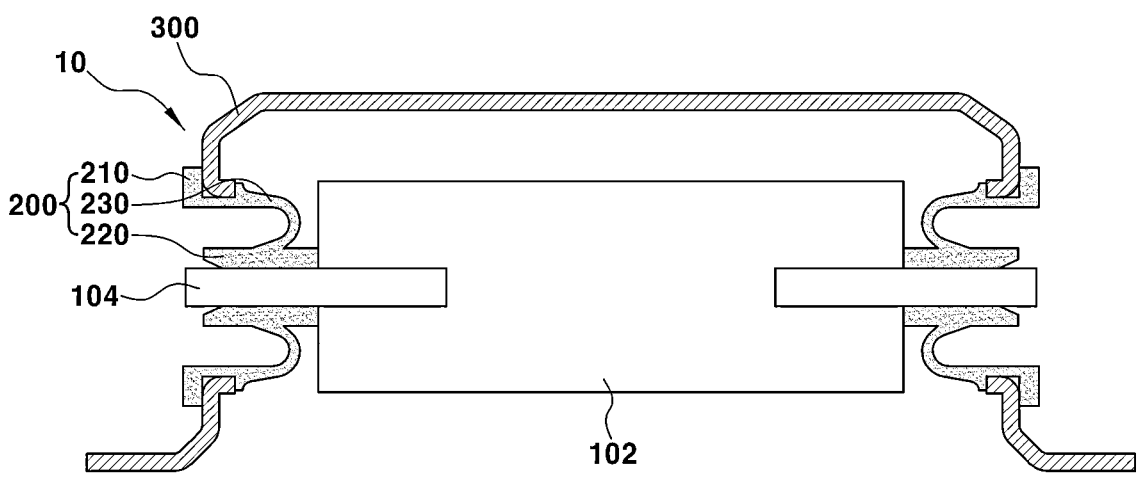
FIG. 1 is a view illustrating a structure of a damper for a vehicle seat according to an embodiment of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in section by the particular intended application and use environment.

In the figures, reference numbers refer to the same or equivalent sections of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles. The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, preferred embodiments according to the present disclosure will be described in detail with reference to the accompanying drawings.

Advantages and features of the present disclosure and methods for achieving them will become clear with reference to embodiments described below in detail in conjunction with the accompanying drawings.

However, the present disclosure is not limited to the embodiments disclosed below but will be implemented in various different forms, these embodiments are merely provided to make the disclosure of the present disclosure complete and fully inform those skilled in the art to which the present disclosure pertains completely of the scope of the present disclosure, and the present disclosure is only defined by the scope of the appended claims.

In addition, in the description of the present disclosure, when it is determined that related known technologies may obscure the gist of the present disclosure, a detailed description thereof will be omitted.

Figure 2:
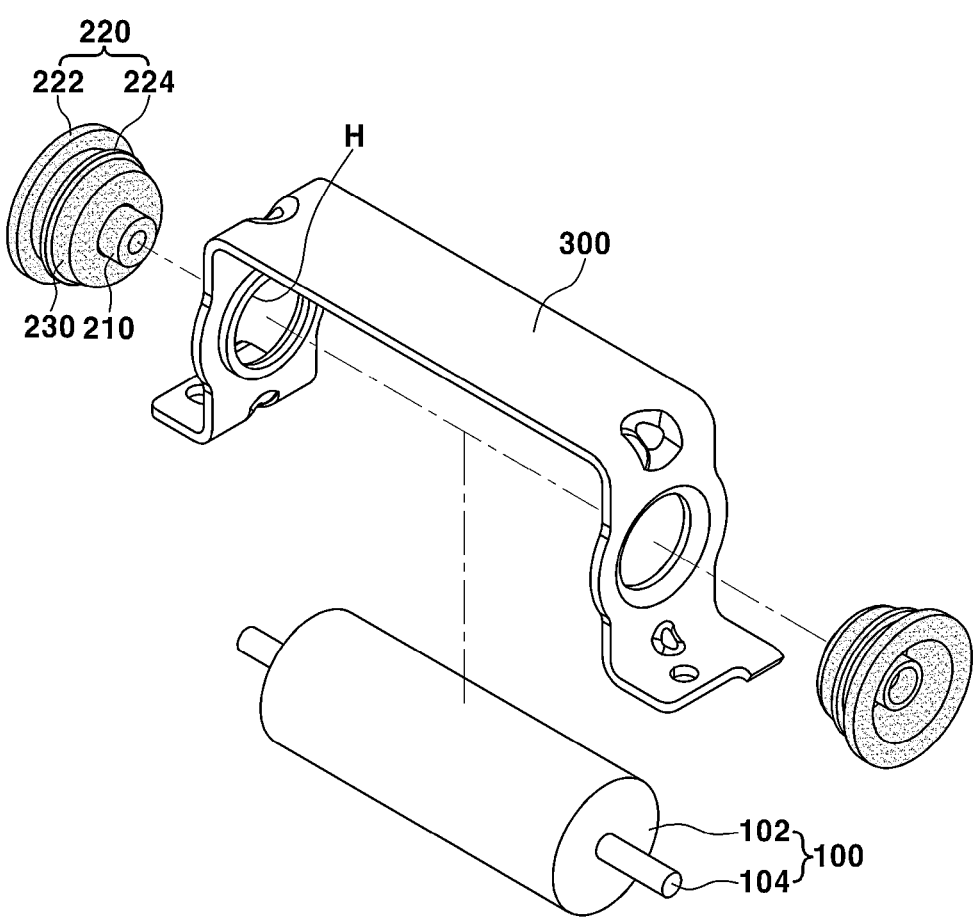
FIG. 2 is a view illustrating a configuration of the damper for the vehicle seat according to the embodiment of the present disclosure.

FIG. 1 is a view illustrating a structure of a damper for a vehicle seat according to an embodiment of the present disclosure, and FIG. 2 is a view illustrating a configuration of the damper for the vehicle seat according to the embodiment of the present disclosure.

Figure 3:
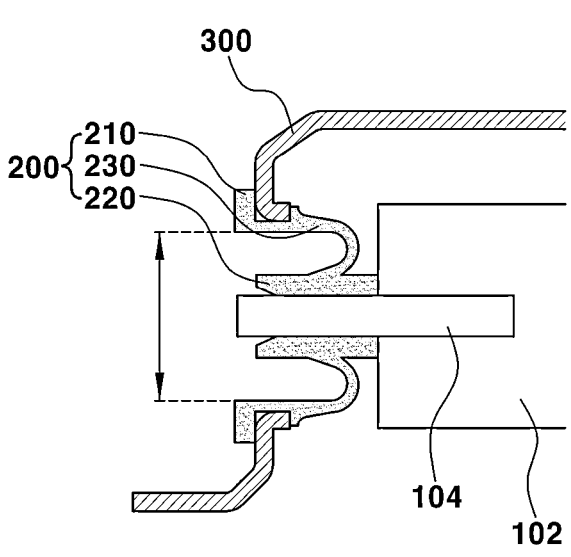
FIG. 3 is a view illustrating a movement range limit of a fixing member with respect to the damper for the vehicle seat according to the embodiment of the present disclosure.
Figure 4:
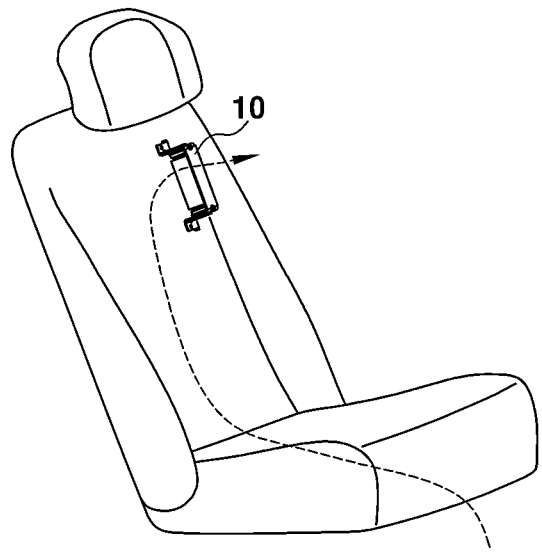
FIGS. 4 and 5 are views illustrating a mounting position for the damper for the vehicle seat according to the embodiment of the present disclosure.
Figure 5:
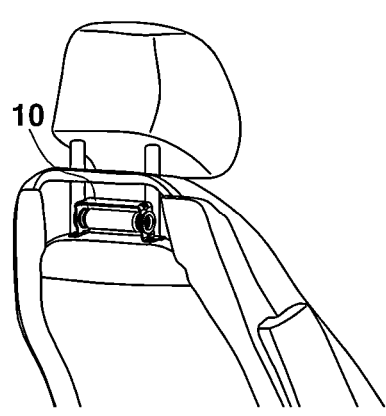
Figure 6:
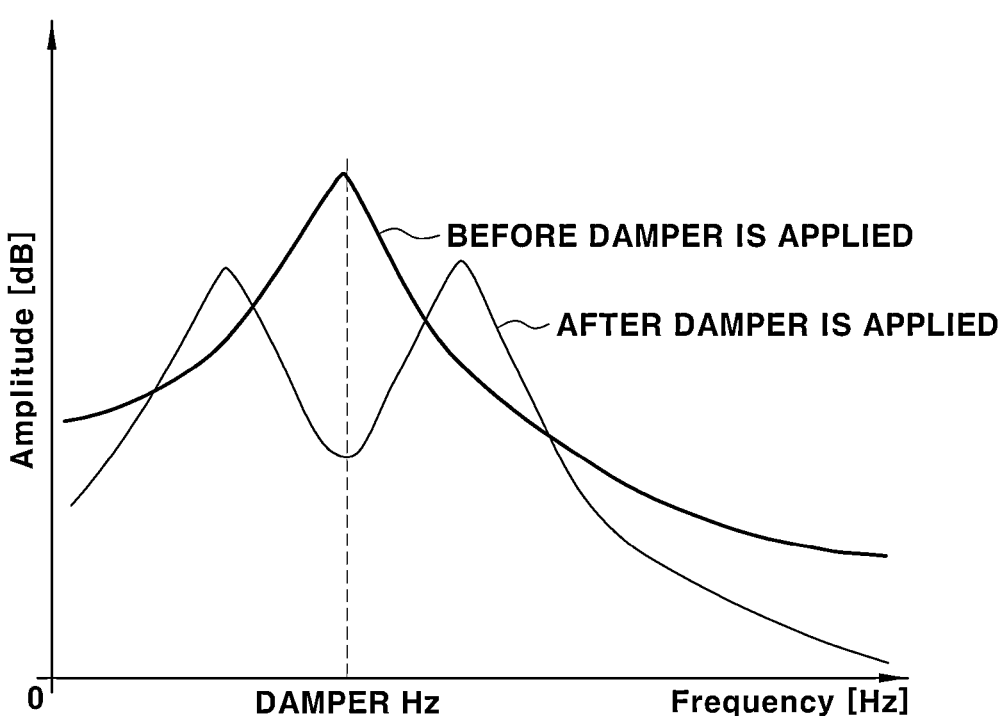
FIG. 6 is a view illustrating vibration performance in a state in which the damper for the vehicle seat according to the embodiment of the present disclosure is applied.

In addition, FIG. 3 is a view illustrating a movement range limit of a fixing member with respect to the damper for the vehicle seat according to the embodiment of the present disclosure, FIGS. 4 and 5 are views illustrating a mounting position for the damper for the vehicle seat according to the embodiment of the present disclosure, and FIG. 6 is a view illustrating vibration performance in a state in which the damper for the vehicle seat according to the embodiment of the present disclosure is applied.

Generally, it is known that vibrations in vehicles may be generated by both external influences such as uneven road surfaces, other cyclic stresses, or stresses similar to periodic collisions and a reciprocating motion of pistons.

These vibrations may be transmitted from a vehicle body to various parts of a vehicle, and in particular, may act on vehicle occupants. In addition, these vibrations may induce undesirable noises, and may adversely affect the comfort of the occupants in the vehicle even without noise stress.

Therefore, in vehicle manufacturing, attempts have already been made to block the generation of vibrations or suppress vibrations after the generation of vibrations, and various approaches have been made from this point of view.

One possible solution is to provide individual vehicle parts with high stiffness and large moments of inertia in order to reduce their sensitivity to vibration, but this approach goes against a general lightweight manufacturing goal of reducing weight and thus improving fuel efficiency of a vehicle.

Therefore, one method of selectively circumventing the rigid manufacturing design is to attenuate vibrations generated in lightweight parts, and to this end, a vibration damper is used in vehicle manufacturing.

Here, the vibration damper is mounted on a vibration-sensitive vehicle part and formed to generate intrinsic vibration due to vibrations of vehicle parts, and the intrinsic vibration is usually generated in an opposite phase with respect to undesirable vibrations of the vehicle parts, resulting in a reduction in vibrations.

Figure 7:
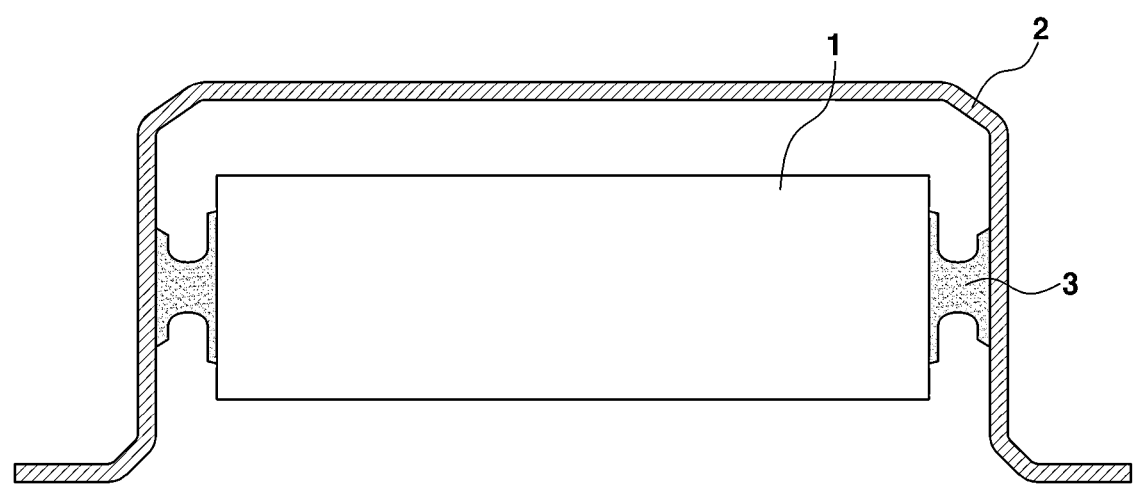
FIG. 7 (PRIOR ART) is a view illustrating a structure of a conventional damper for a vehicle seat.

As shown in FIG. 7 (PRIOR ART), in the conventional structure, a vibration damper installed on a vehicle seat connects a vibrating mass member 1 and a bracket 2 in a bonded form through a bush 3 to structurally attenuate vibrations, that is, when vibrations are input, the vibrating mass member 1 is vibrated by the vibrations transmitted to the bracket 2 to emit energy instead of the vehicle seat and reduce vibrations of all seats.

However, since a natural frequency is reduced as the number of functions applied to vehicle seats increases and as vehicle seats become heavier, in installing the damper on the vehicle seat, generally, a weight of the vibrating mass member 1 needs to be relatively increased and a thickness of the bush 3 also needs to be relatively reduced to reduce vibrations in a specific frequency band having a low natural frequency.

However, when the weight of the vibrating mass member 1 is increased as described above, a load is inevitably concentrated on the bush 3 for supporting the vibrating mass member 1, and thus the bush 3 connected to the bracket 2 in the bonded form may be damaged such as being disconnected from the bracket 2, which may degrade durability and vibration performance of the vehicle seat.

In order to address this problem, as shown in FIG. 1, a damper 10 for a vehicle seat according to an embodiment of the present disclosure includes a vibrating mass member assembly 100, a guide bush 200, and a mounting bracket 300.

As shown in FIG. 2, the vibrating mass member assembly 100 includes a vibrating mass member 102 and a fixing member 104 protruding from a side of the vibrating mass member 102. Preferably the vibrating mass member assembly 100 includes fixing members 104 protruding from both sides of the vibrating mass member 102.

$$\omega = \sqrt{\frac{k}{m}} \qquad \text{[Equation 1]}$$

(w: natural frequency, k: elastic constant, m: weight of vibrating mass member)

As provided herein, the fixing member 104 may be a fixing pin, but any suitable alternative may be used, such as a peg, dowel, rivet, screw, bolt, nail, anchor, or any other attachment mechanism.

For example, a plurality of vibrating mass member assemblies 100 may be provided each including two fixing members 104. By providing the plurality of vibrating mass member assemblies 100, vibrating mass members 102 having different weights may be used, in order to allow the vehicle seat to be adjusted in response to a natural frequency reduced due to an increase in the weight of the vehicle seat. For example, one of the vibrating mass member assemblies 100 may be replaced by another vibrating mass member assembly 100 with increased weight of the vibrating mass member 102 (referring to Equation 1, the natural frequency (w) is inversely proportional to the weight (m) of the vibrating mass member 102), thereby improving vibration performance for the vehicle seat in a specific frequency.

That is, by selectively manufacturing the damper 10 through the replacement with the vibrating mass member assembly 100 equipped with the vibrating mass member 102 having a different mass and damping the vibrations at the specific frequency input to the vehicle seat, it is possible to reduce the vibrations, thereby improving vibration performance of the vehicle seat.

The guide bush 200 accommodates the fixing member 104 therein, and the guide bush 200 may be coupled to each of both sides of the vibrating mass member 102, and guides the vibrating mass member 102 to move in all directions.

To this end, the guide bush 200 includes a coupling member 210, a fastening member 220, and a connection member 230.

The coupling member 210 preferably is made of a rubber material having elasticity and formed in a pipe shape to surround an outer circumferential surface of the fixing member 104.

In addition, the fastening member 220 may be formed to have a diameter corresponding to a diameter of an insertion hole H provided in the mounting bracket 300 and positioned to be caught in the insertion hole H through the fastening member 220.

In particular, the fastening member 220 may include a latching part 222 having a predetermined diameter to be positioned to be caught in the insertion hole H and a seating part 224 seated inside the mounting bracket 300 formed with the insertion hole H (see FIG. 2) and allow the guide bush 200 to be fixed to the mounting bracket 300 through the configuration of the latching part 222 and the seating part 224.

Here, the fastening member 220 may include a plurality of guide bushes 200 having different thicknesses of the latching part 222 so that an elastic force of the guide bush 200 may be adjusted.

That is, in order to reduce the vibrations in the specific frequency band having a relatively low natural frequency, the guide bush 200 may accommodate the fixing member 104 through the replacement with the guide bush 200 including the selected fastening member 220 with a smaller thickness, more specifically, a relatively reduced elastic force and may be coupled to the vibrating mass member 102 (referring to Equation 1, the natural frequency (w) is proportional to the elastic constant (k)), thereby improving the vibration performance of the vehicle seat at the specific frequency together with the vibrating mass member assembly 100.

The connection member 230 connects the coupling member 210 and the fastening member 220, limits the movement range of the fixing member 104 inside the insertion hole H, and is formed to absorb an impact transmitted from the vibrating mass member 102.

That is, as shown in FIG. 3, the connection member 230 may have an "U" shape and has one end and an opposite end connecting the coupling member 210 and the fastening member 220 so that the vibrating mass member 102 may move in all directions such as horizontally and vertically through such a shape, thereby preventing a reduction in durability of the damper 10 and damping the vibrations due to the movement of the vibrating mass member 102 even when the thickness of the fastening member 220 is reduced as described above.

In the case of the conventional structure shown in FIG. 7, since the vibrating mass member 1 and the bracket 2 are connected in the bonded form through the bush 3, when the bush 3 is changed to the bush 3 having a smaller thickness in order to reduce the vibrations in the low frequency band having the low natural frequency, the connection structure in the bonded form may be disconnected by the above structure.

Therefore, according to the embodiment of the present disclosure, the damper 10 for the vehicle seat in which the thickness of the fastening member 220 together with the weight of the vibrating mass member 102 has been selectively adjusted may be applied, and the coupling member 210, the fastening member 220, and the connection member 230 constituting the guide bush 200 including the fixing member 104 may be applied, thereby solving the problem such as the disconnection of the guide bush 200 and at the same time, reducing the vibrations in the specific frequency band as shown in FIG. 6.

Meanwhile, an operating state based on the configuration of the damper 10 for the vehicle seat according to the embodiment will be described as follows.

When vibrations due to traveling of a vehicle are input, the vibrations are transmitted to the mounting bracket 300, and as described above, the vibrations in the specific frequency band corresponding to the natural frequency (w) of the damper 10 determined by the weight (m) of the vibrating mass member 102 and the elasticity (k) of the fastening member 220 are emitted as energy by the movement of the vibrating mass member 102 (see [Equation 1]).

At this time, the connection member 230 coupled to the mounting bracket 300 may restrict the maximum movement of the fixing member 104 like a vertical interval shown in FIG. 3 to absorb the energy emitted from the vibrating mass member 102 applied to the mounting bracket 300 by the movement of the fixing member 104, thereby effectively reducing the vibrations and increasing durability.

Meanwhile, the mounting bracket 300 may have the insertion hole H into which the guide bush 200 is inserted and may be formed to be vertically fixedly mounted on a front surface of the vehicle seat as shown in FIG. 4 in consideration of the layout of the internal structure of the vehicle seat.

In mounting the mounting bracket 300 on the vehicle seat, as described above, since the mounting bracket 300 has the structure with improved vibration attenuation and durability, the mounting bracket 300 may be mounted at various different positions considering the layout of the interval structure of the vehicle seat, and for example, as shown in FIG. 5, the mounting bracket 300 may be mounted on a rear surface of the vehicle seat horizontally, thereby reducing the vibrations transmitted to the vehicle seat through the vibrations in the specific frequency band.

According to the present disclosure, by including the vibrating mass member constituting the fixing point in the form of the pin and the bush made of rubber to be connected to a bracket mounted on the vehicle seat and having the mounting for fixing the bush in the width direction provided on both sides of the bracket to enable the vibrating mass member to move vertically and horizontally in the specific frequency band by the elasticity of the bush, it is possible to reduce vibrations transmitted to the vehicle seat.

In addition, compared to the conventional damper structure in which one side of the bush is bonded to the vibrating mass member and an opposite side of the bush is bonded to the bracket, since the damper for the vehicle seat according to the present disclosure has the structure in which the bush is movably formed, it is possible to prevent the problem that the part to which the bush is bonded is damaged due to the input load.

The present disclosure has been described above with reference to the embodiment(s) shown in the drawings, but it will be understood that this is only illustrative, and various modifications can be made from the present disclosure by those skilled in the art, and all or some of the above-described embodiment(s) may also be configured in selective combination thereof. Therefore, the true technical scope of the present disclosure should be determined by the technical spirit of the appended claims.

What is claimed is:

1. A damper for a vehicle seat, comprising:
   a vibrating mass member assembly including a vibrating mass member and a fixing member protruding from a side of the vibrating mass member;
   a guide bush accommodating the fixing member therein, coupled to the side of the vibrating mass member, and guiding the vibrating mass member to move in all directions; and
   a mounting bracket having an insertion hole into which the guide bush is inserted,
   wherein the guide bush includes:
      a coupling member formed to surround an outer circumferential surface of the fixing member;
      a fastening member formed to have a diameter corresponding to a diameter of the insertion hole and positioned to be caught in the insertion hole; and
      a connection member for connecting the coupling member and the fastening member, restricting a movement range of the fixing member inside the insertion hole, and formed to absorb an impact transmitted from the vibrating mass member, wherein the connection member has a "U" shape and has one end and an opposite end connecting the coupling member and the fastening member.

2. The damper of claim 1, further comprising an additional fixing member protruding from another side of the vibrating mass member.

3. The damper of claim 2, wherein the fixing member and the additional fixing member constitute fixing pins that protrude from both sides of the vibrating mass member.

4. The damper of claim 1, wherein the guide bush is made of a rubber material having elasticity.

5. The damper of claim 1, wherein the vibrating mass member assembly includes a plurality of vibrating mass members having different weights.

6. The damper of claim 5, wherein the vibrating mass member assembly is selectively replaced and coupled to the guide bush.

7. The damper of claim 1, wherein a plurality of guide bushes having different thicknesses are formed to accommodate the fixing member.

8. The damper of claim 1, wherein a plurality of guide bushes are replaceably coupled to the vibrating mass member.

9. The damper of claim 1, wherein the mounting bracket is fixedly mounted on a front surface of the vehicle seat vertically.

10. The damper of claim 1, wherein the mounting bracket is fixedly mounted on a rear surface of the vehicle seat horizontally.

11. A vehicle seat comprising the damper of claim 1.

12. A vehicle comprising the damper of claim 1.

13. A damper for a vehicle seat, comprising:

a vibrating mass member assembly including a vibrating mass member and a fixing member protruding from a side of the vibrating mass member;

a guide bush accommodating the fixing member therein, coupled to the side of the vibrating mass member, the guide bush being made of a rubber material having elasticity, and guiding the vibrating mass member to move in all directions; and a mounting bracket having an insertion hole into which the guide bush is inserted, wherein the guide bush restricts a movement range of the fixing member inside the insertion hole and absorbs an impact transmitted from the vibrating mass member, and wherein the guide bush includes:

a coupling member formed to surround an outer circumferential surface of the fixing member;

a fastening member formed to have a diameter corresponding to a diameter of the insertion hole and positioned to be caught in the insertion hole; and a connection member for connecting the coupling member and the fastening member, restricting a movement range of the fixing member inside the insertion hole, and formed to absorb an impact transmitted from the vibrating mass member, wherein the connection member has a "U" shape and has one end and an opposite end connecting the coupling member and the fastening member.

14. The damper of claim 13, further comprising an additional fixing member protruding from another side of the vibrating mass member.

15. The damper of claim 14, wherein the fixing member and the additional fixing member constitute fixing pins that protrude from both sides of the vibrating mass member.

16. A vehicle seat comprising the damper of claim 13.

17. A vehicle comprising the damper of claim 13.

18. A damper for a vehicle seat, comprising:

a vibrating mass member assembly including a vibrating mass member and a fixing member protruding from a side of the vibrating mass member;

a guide bush accommodating the fixing member therein, coupled to the side of the vibrating mass member, and guiding the vibrating mass member to move in all directions; and a mounting bracket having an insertion hole into which the guide bush is inserted, wherein the guide bush includes:

a coupling member coupled to the fixing member;

a fastening member engaged with the insertion hole of the mounting bracket; and a connection member connecting the coupling member and the fastening member, wherein the connection member extends between the coupling member and the fastening member to define a deformation space therebetween to allow the coupling member to move relative to the fastening member.

\* \* \* \* \*